United States Patent [19]
Zobel et al.

[11] 3,860,938
[45] Jan. 14, 1975

[54] PHOTOGRAPHIC APPARATUS FOR USE WITH PERCUSSIVELY IGNITABLE FLASH LAMPS

[75] Inventors: Siegfried Zobel; Rainer Spinnler, both of Munich; Gabriele Ehgartner, Pullach; Fridolin Hennig, Munich, all of Germany

[73] Assignee: AGFA-Gevaert Aktiengesellschaft, Leverkusen, Germany

[22] Filed: Aug. 1, 1973

[21] Appl. No.: 384,399

[30] Foreign Application Priority Data
Aug. 4, 1972  Germany............................ 2238331

[52] U.S. Cl................................. 354/144, 354/142
[51] Int. Cl...................... G03b 15/04, G03b 19/04
[58] Field of Search........ 95/11 L, 11.5 R; 354/144, 354/148, 142

[56] References Cited
UNITED STATES PATENTS
3,463,067  8/1969  Fauth et al......................... 95/11 L
3,675,565  7/1972  Pagel................................... 95/11 L Primary Examiner—Samuel S. Matthews
Assistant Examiner—Kenneth C. Hutchison
Attorney, Agent, or Firm—Michael S. Striker

[57] ABSTRACT

A still camera for use with holders for percussively ignitable flash lamps wherein the holder is connectable to a socket in or on the body of the camera and the socket is indexible by the film transporting mechanism through the intermediary of motion transmitting means having a reciprocable, pivotable and/or axially movable slide or a gear train. The condition of that flash lamp which faces the subject is scanned by a lever which prevents the motion transmitting means from indexing the socket when an unfired lamp faces the subject or when the holder is detached from the socket.

19 Claims, 7 Drawing Figures

PHOTOGRAPHIC APPARATUS FOR USE WITH PERCUSSIVELY IGNITABLE FLASH LAMPS

BACKGROUND OF THE INVENTION

The present invention relates to photographic apparatus in general, and more particularly to improvements in photographic apparatus (especially still cameras) for use with percussively ignitable flash lamps. Holders for such flash lamps are available on the market and are known as "Magicubes." A holder normally comprises four equidistant flash lamps located in front of suitable reflectors and being ignitable in response to release of energy which is stored by impellers, for example, n the in of percussion wires which can be caused to dissipate energy in response to actuation of the camera release. The holder can be attached to an indexible socket in or on the camera body and is normally indexed with the socket in automatic response to actuation of the film transporting mechanism for the purpose of moving the foremost unexposed film frame into register with the picture taking lens. The means for firing an intact lamp which faces the subject normally comprises a lever or an analogous movable part which can enter apertures in the bottom wall or base of a properly attached holder to disengage the percussion wire from a stop or to disengage a first portion of a percussion wire from a second portion in response to actuation of the camera release whereby the flash lamp which faces the subject is fired while the shutter is open to admit light against the foremost unexposed film frame. As a rule, the socket for the flash lamp holder is provided with projections in the form of teeth or pins which can be engaged by a pawl or another suitable member receiving motion from the film transporting mechanism and serving to index the socket when the film transporting mechanism is actuated to advance the film by the length of a frame upon completion of an exposure and prior to the maxing of the next exposure.

A drawback of presently known cameras which can use indexible holders for percussion ignitable flash lamps is that the socket for the holder is indexed whenever the film transporting mechanism is actuated to advance the film by the length of a frame. This is undesirable for a number of reasons, i.e., because the indexing of a socket which does not carry a flash lamp holder merely results in excessive wear upon the socket and its bearings and also because such indexing might result in movement of an intact flash lamp out of an optimum position for illumination of a subject during the making of the next exposure. Thus, if a flash lamp holder is attached to the socket in such a way that a single remaining unfired flash lamp faces the subject, an indexing of the socket will result in angular movement of the intact lamp from such optimum position and in the placing of a fired or spent lamp into a position in which the lamps must be held during firing in order to be capable of furnishing artificial light for illumination of the subject which is seen by the user of the camera through the viewfinder. The socket is normally indexed through 90 degrees and is preferably directly coupled to the base of a multiple flash lamp holder with four flash lamps.

SUMMARY OF THE INVENTION

An object of the invention is to provide a photographic apparatus, especially a still camera, which can be used with indexible holders for percussion ignitable flash lamps and which is constructed and assembled in such a way that the socket for the holder is indexed only when it is properly attached to a flash lamp holder.

Another object of the invention is to provide a photographic apparatus of the just outlined character wherein the socket for a flash lamp holder can be indexed only when it is connected with a holder and when a spent or fired flash lamp of the holder faces the subject.

A further object of the invention is to provide the photographic appartus with novel and improved means for scanning the condition of those flash lamps which face the subject and to provide the apparatus with novel and improved means for indexing the socket for a flash lamp holder in the event that the actuation of film transporting mechanism is to take place while a spent flash lamp faces the subject.

An additional object of the invention is to provide a photographic apparatus wherein the means for indexing the socket for a flash lamp holder occupies little room and can automatically discriminate between situations when an indexing of a properly attached holder for percussion ignitable flash lamps is necessary because a fired flash lamp is in a position which should be occupied by an unfired flash lamp prior to making of an exposure with flash and when an indexing is unnecessary or undesirable, either because the socket is not connected with a holder or because the holder is attached to the socket in such angular position that an unfired flash lamp faces the subject.

The invention is embodied in a photographic apparatus for use with holders containing groups or arrays of percussively ignitable flash lamps and having for each lamp an indicator (e.g., an end portion or leg of an elastic percussion wire) which respectively assumes a first and a second position when the corresponding flash lamp is respectively intact (unfired) and fired. The photographic apparatus comprises a supporting device (e.g., a socket) which can detachably support a flash lamp holder and is indexible between a plurality of angular positions to thereby move successive flash lamps of the holder thereon to an optimum position for illumination of a subject with artificial light, a film transporting device which is actuatable to transport the film lengthwise (i.e., through a distance corresponding to the length of a frame when the invention is embodied in a still camera), motion transmitting means (in the form of a slide, a gear train or the like) which is interposed between the film transporting device and the supporting device, and scanning means (e.g., a lever) for tracking the indicator associated with that lamp of a holder on the supporting device which assumes the aforementioned optimum position for illumination of a subject. The scanning means is movable (preferably by the holder on the supporting device) to a first position which corresponds to the first position of the indicator for the lamp in the optimum position and in which the scanning means disengages the motion transmitting means from the film transporting device and/or from the supporting device so that the actuation of film transporting device does not result in indexing of the supporting device. The scanning means is further movable (e.g., by a spring to) a second position which corresponds to the second position of the indicator of the lamp in optimum position for illumination of a subject and in which the scanning means allows the motion transmitting means to index the supporting device in response to actuation of the film transporting device.

The scanning means preferably dwells in the first position when the holder is detached from the supporting device so that the supporting device need not be indexed during the making of exposures without artificial illumination of the subject.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
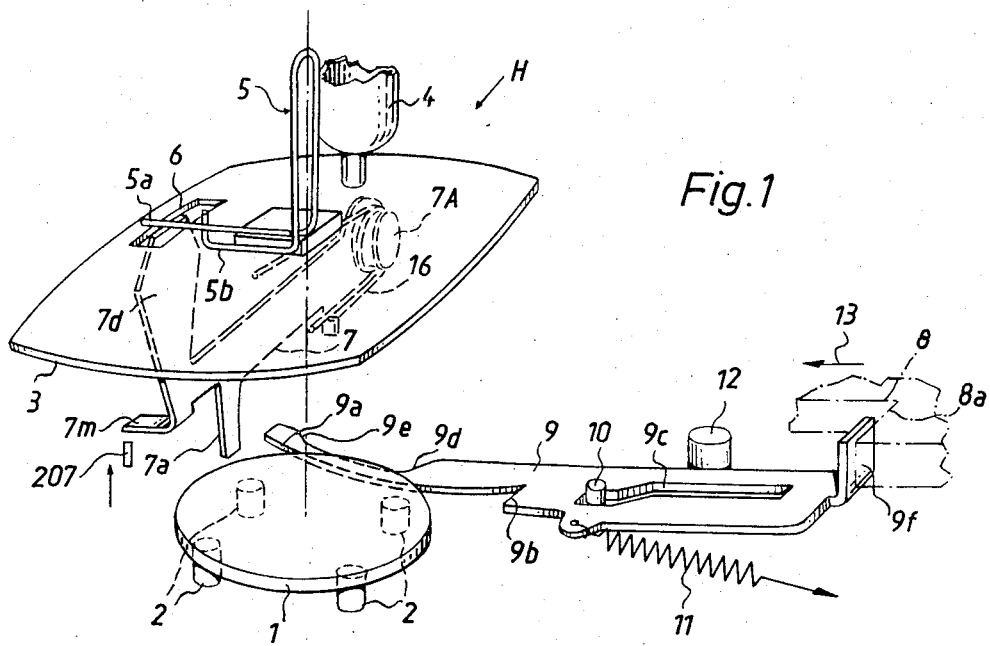
FIG. 1 is a fragmentary perspective view of a holder for percussively ignitable flash lamps and of a photographic apparatus which embodies one form of the invention, the parts of the apparatus being shown in positions they assume when an unfired flash lamp faces the subject and prior to transport of photographic film by the length of a frame.
Figure 2:
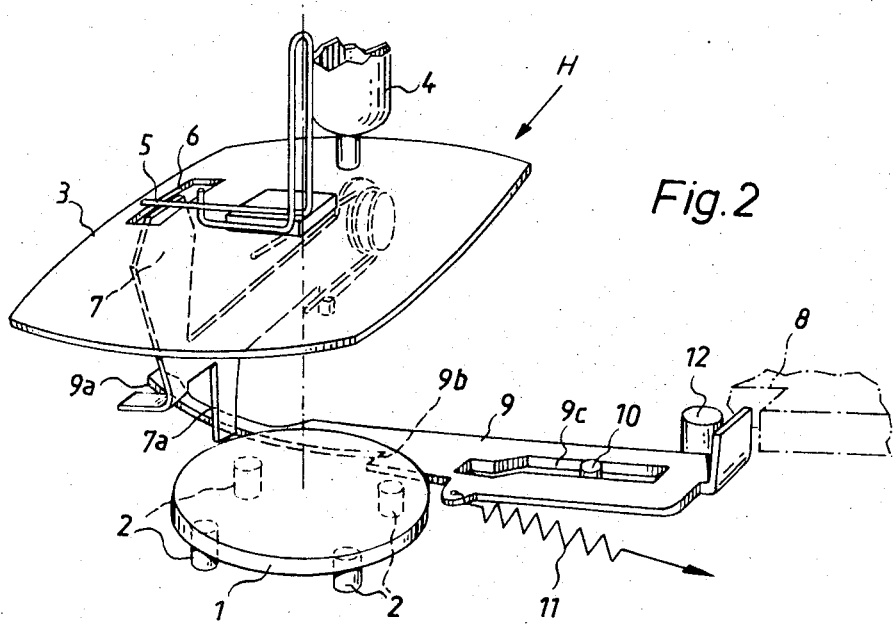
FIG. 2 is a similar view but showing the parts of the photographic apparatus during film transport.
Figure 3:
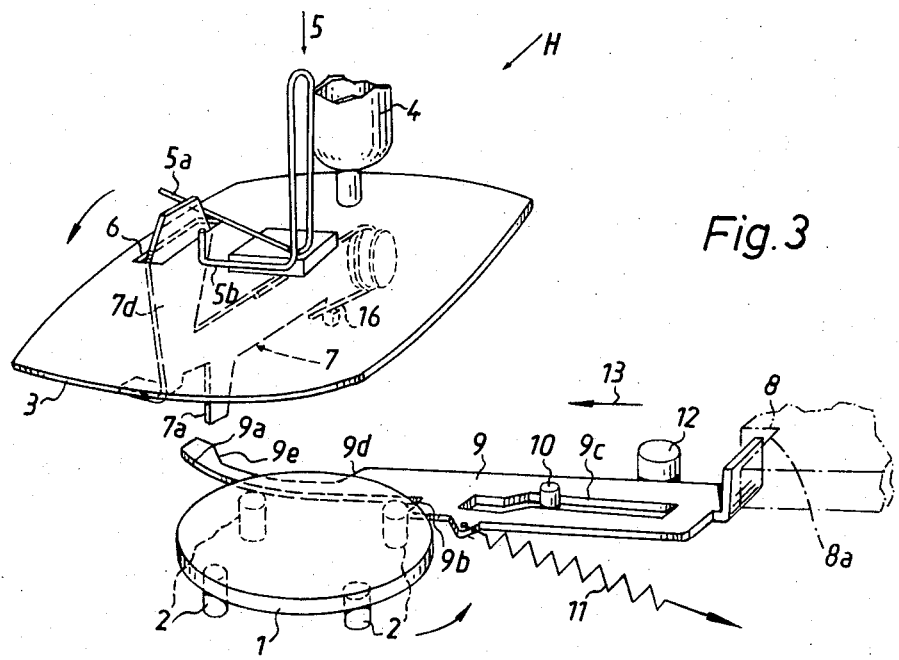
FIG. 3 is a similar view but showing the parts of the photographic apparatus in positions they assume during indexing of the flash lamp holder so as to move an unfired lamp into a position for illumination of the subject.

Referring first to FIGS. 1 to 3, there is shown a portion of a still camera and a portion of a substantially cuboid holder H for a plurality of percussively ignitable flash lamps 4. The holder H is of the type known as "Magicube" and comprises a base plate 3 provided with four apertures 6, one for each of the four flash lamps 4. Each flash lamp 4 is located in front of a suitable reflector (not shown) and each flash lamp can be fired in response to dissipation of energy by a percussion wire 5 which is mounted in the holder H and normally stores energy due to the fact that one (5a) of its legs is engaged and held by the other leg 5b. In order to fire a flash lamp 4, it is necessary to lift the leg 5a to a level above the tip of the leg 5b whereby the leg 5a is free to dissipate energy and initiates the firing of the respective lamp 4 in a manner well known from the art of such lamp holders.

The base plate 3 of the illustrated flash lamp holder H is separably coupled to a disk-shaped socket 1 which is mounted in the body or housing of the still camera and is indexible in response to actuation of the film transporting device or mechanism 8. To this end, the socket 1, comprises four equidistant downwardly extending projections in the form of pins 2 one of which is normally located in the path of movement of an entraining portion or shoulder 9b provided on a motion transmitting means in form of a slide 9 mounted in the camera body for pivotal movement about a fixed guide pin 10 as well as for trnaslatory movement transversely of the pin 10. The right-hand end portion of the slide 9 has an upwardly bent lug 9f which is normally located in the path of movement of a shoulder 8a on the illustrated element of the film trnasporting mechanism 8. The latter is movable in and counter to the direction indicated by an arrow 13 and is arranged to transport the film by the length of a frame during movement in the direction indicated by the arrow 13. At the same time, the shoulder 8a moves the slide 9 against the opposition of a helical spring 11 which is anchored in the camera body and tends to pivot the slide 9 in a counterclockwise direction, as viewed in FIGS. 1 to 3. A fixed stop 12 is provided in the camera body to determine the extent of movement of the film transporting mechanism 8 and slide 9 in the direction indicated by the arrow 13.

The shoulder 9b of the slide 9 can index the socket 1 through angles of 90° whereby the holder H shares such angular movements of the socket and places successive flash lamps 4 into an optimum position with respect to the subject, i.e., into such position that an unfired flash lamp faces the subject which is observed in the viewfinder of the camera and illuminates the subject in response to firing, i.e., in response to opening of the shutter, not shown.

In accordance with a feature of the invention, the camera comprises tracking or scanning means having a member 7 in the form of a lever which is pivotally mounted in the camera body, as at 7A, and is biased by a torsion spring 16 so that its upwardly extending portion or arm 7d bears against the underside of a properly attached base plate 3 and penetrates into an oncoming aperture 6 to engage the leg 5a of a wire 5 provided that the leg 5a is held by the leg 5b. FIGS. 1 and 2 illustrate the holder H in an angular position in which an unfired flash lamp 4 faces the subject; therefore, the leg 5a of the respective wire 5 is held by the leg 5b and the arm 7d of the scanning lever 7 bears against the leg 5a so that the extent to which the arm 7d can penetrate into the interior of the holder H is limited by the wire 5.

The scanning lever 7 further comprises a downwardly extending projection or arm 7a which can be engaged by a convex cam face 9a at the front end of the slide 9 whereby the arm 7a pivots the slide 9 in a clockwise direction (i.e., against the opposition of the spring 11) while the film transporting mechanism 8 moves in the direction indicated by arrow 13 with the result that the shoulder 9b bypasses the nearest pin 2 of the socket 1 and the latter does not change its angular position.

If desired, the scanning lever 7 may constitute the means for disengaging the leg 5a from the leg 5b of that wire 5 which is associated with an unfired flash lamp 4 facing the subject. To this end, the camera release may comprise a portion 207 which moves a third arm 7m of the scanning lever 7 upwardly, as viewed in FIGS. 1 to 3, so as to lift the leg 5a over the leg 5b and to thus cause the wire 5 to initiate the firing of the associated lamp 4 while the shutter is open. However, it is clear that the leg 5a of the wire 5 can be lifted over the leg 5b by a discrete actuating member which is not shown in the drawing. The purpose of the scanning lever 7 is to determine whether or not the lamp 4 which faces the subject is intact or has been fired, and to influence the angular position of the slide 9 accordingly. Thus, when the lamp 4 which faces the subject is intact, an actuation of the film transporting mechanism 8 should not result in indexing of the socket 1 and holder H. On the other hand, if the lamp 4 which faces the subject has been fired, the holder H should be indexed so as to place an intact lamp into a position for firing and for illumination of the subject in response to depression of the shutter release. The scanning lever 7 may further serve to indicate the condition of the flash lamp 4 which faces the subject (i.e., whether or not such flash lamp is intact) as well as to block the camera release in the event that the lamp which faces the subject has been fired. For example, the scanning lever can displace an index or pointer which is thereby caused to extend into the viewfinder of the still camera whenever its arm 7d has penetrated into the adjacent aperture 6 to an extent which is indicative of the fact that the corresponding lamp 4 has been fired. At the same time, the lever 7 can move an obstruction into the path of movement of the camera release so that the user feels the increased resistance of the camera release and is thereby informed that a spent lamp 4 faces the subject, i.e., that the holder H must be indexed or replaced with a holder H containing unfired lamps if the next exposure is to be made with artificial illumination of the subject. Such auxiliary functions of the scanning lever are incidental to its main function, namely, to prevent the indexing of the socket 1 when an unfired flash lamp 4 faces the subject and to allow for indexing of the holder H in response to actuation of the film transporting mechanism 8 when the mechanism 8 is actuated while a fired lamp 4 faces the subject.

When the holder H is detached from the socket 1, the spring 16 automatically tends to maintain the scanning lever 7 in such position that the slide 9 can bypass the nearest pin 2 of the socket 1 when the mechanism 8 is actuated to advance the film by the length of a frame, i.e., to place the foremost unexposed film frame into register with the picture taking lens. It is preferred to provide in the camera means which automatically moves the scanning lever 7 to the position shown in FIGS. 1 and 2 (i.e., to the same position as if the arm 7d of the lever 7 were to engage a cocked leg 5a) so that the lever 7 then fails to block the camera release and does not initiate an indication that an unfired flash lamp faces the subject. This is normally desirable since the camera release should not be blocked when the holder H is detached and the user of the camera knows anyway that the holder H is not coupled to the socket 1 so that an indication in the viewfinder is superfluous. Also, such positioning of the lever 7 in response to detachment of the holder H prevents unnecessary indexing of the socket 1.

The scanning lever 7 insures that the socket 1 will not be indexed when an unfired flash lamp 4 faces the subject. For example, it can happen that the user of the camera attaches to the socket 1 a holder H which contains a single unfired flash lamp 4 and that the single unfired flash lamp faces the subject when the attachment of the holder H to the socket 1 is completed. Were the socket 1 indexed in response to actuation of the film transporting mechanism 8 subsequent to attachment of the holder H with a single intact flash lamp 4, the intact flash lamp would be moved from the position in which it can be properly illuminate the subject in response to firing.

Another feature of the scanning lever 7 is that it prevents unnecessary indexing of the socket 1, for example, when the flash lamp holder H is detached from the socket as well as when the socket is connected with a fresh holder H having four intact flash lamps 4 therein or with a holder H having at least one unfired flash lamp which faces the subject.

The slide 9 is further provided with a specially configurated (substantially Z-shaped) slot 9c which receives the guide pin 10 and insures that the slide 9 performs a predetermined sequence of pivotal and translatory movements in response to movement of the film transporting mechanism 8 in the direction indicated by arrow 13.

FIG. 1 shows the slide 9 in a retracted position in which the slide is held by the spring 11. Thus, the lug 9f of the slide 9 abuts against the shoulder 8a of the film transporting mechanism 8 and an edge face of the slide 9 simultaneously bears against the fixed stop 12. The guide pin 10 is located in the front end portion of the slot 9c. The holder H is attached to the socket 1 in such angular position that an unfired flash lamp 4 faces the subject. Therefore, the arm 7d of the scanning lever 7 abuts against the leg 5a of the wire 5 which is associated with the unfired flash lamp 4, and the leg 5a is cocked because it abuts against and is held by the leg 5b. The arm 7a of the lever 7 extends into the path of movement of the convex cam face 9a on the slide 9. The attachment of holder H to the socket 1 is assumed to have been completed after the making of an exposure and prior to actuation of the film transporting mechanism 8, i.e., the picture taking lens is assumed to be in register with the rearmost exposed film frame.

The user thereupon pivots the customary rapid transport lever (not shown) or an analogous input member of the film transporting mechanism 8 so as to move the shoulder 8a in the direction indicated by the arrow 13. The shoulder 8a engages the lug 9f and pushes the slide 9 in the direction indicated by arrow 13 whereby the shoulder 9b of the slide bypasses the nearest pin 2 of the socket 1 because the arm 7a of the scanning lever 7 extends into the path of movement of the convex cam face 9a and pivots the slide 9 clockwise while the slide moves forwardly with the shoulder 8a. Thus, the scanning lever 7 prevents the slide 9 from indexing the socket 1 in respose to actuation of the film transporting mechanism 8 because its arm 7d engages a cocked leg 5a. The exposure can be made upon completion of film transport by the length of a frame; to this end, the user depresses the camera release which opens the shutter and causes the scanning lever 7 (see the portion 207 and arm 7m) or a separate part to lift the leg 5a over the leg 5b so that the flash lamp 4 which faces the subject is fired while the shutter is open.

The manner in which the shoulder 9b of the slide 9 bypasses the adjacent pin 2 of the socket 1 during movement of the film transporting mechanism 8 in the direction indicated by arrow 13 is shown in FIG. 2. The forward movement of the slide 9 is terminated when the shoulder 8a reaches the stop 12. The latter arrests the film transporting mechanism 8 at the exact moment when the foremost unexposed film frame registers with the picture taking lens.

FIG. 3 illustrates the structure of FIG. 1 or 2 but with the scanning lever 7 in a position it assumes when the arm 7d is free to penetrate deeper into the adjacent aperture 6 of the base plate 3 because the flash lamp 4 which faces the subject has been fired. As shown, the leg 5a has been lifted over the leg 5b of the respective wire 5 so that the preferably trapezoid upper end portion of the arm 7d extends well into the interior of the holder H. Therefore, the arm 7a of the scanning lever 7 is located above the path of movement of the convex cam face 9a of the slide 9 and, when the slide 9 is caused to move in the direction indicated by arrow 13, the shoulder 9b is free to engage the nearest pin 2 and indexes the socket 1 with the holder H thereon through 90° in response to completed transport of the film by the length of a frame. The flash lamp 4 which faces the subject prior to actuation of the film transporting mechanism 8 is assumed to have been fired during the making of the preceding exposure or because the holder H has been attached to the socket 1 in such angular position that a fired lamp 4 faces the subject. In either event, the actuation of film transporting mechanism 8 automatically results in an indexing of the socket 1 and holder H through 90°. The spring 11 is strong enough to insure that the shoulder 9b engages and moves the nearest pin 2 of the socket 1 when the transporting mechanism 8 is actuated to advance the film by the length of a frame while the arm 7a of the scanning lever 7 is located above the path of movement of the convex cam face 9a.

As the shoulder 9b of the slide 9 indexes the socket 1, the trapezoid head of the arm 7d is expelled from the aperture 6 of the base plate 3 whereby the arm 7a moves downwardly and enters a cutout or recess 9d of the slide 9. The recess 9d is located opposite the convex cam face 9a and is bounded by a concave cam face 9e. Due to provision of the recess 9d therein, the front portion of the slide 9 is weakened to such an extent that it can undergo a reasonable amount of elastic deformation which is needed to allow the slide 9 to return to the starting position of FIG. 1 as soon as the film transporting mechanism 8 is free to reassume its starting position. It will be noted that the convex cam face 9a of the slide 9 can travel along the right-hand or rear edge face of the arm 7a and that the concave cam face 9e of the slide 9 can travel along the left-hand or front edge face of the arm 7a. The just discussed elasticity of the portion between the cam faces 9a, 9e enables the slide 9 to return to the starting position under the action of the spring 11 after the shoulder 9b has completed the indexing of socket 1 and holder H through 90° in spite of the fact that the arm 7a is located in the lower end position, i.e., in a position corresponding to that shown in FIG. 1 in which the arm 7d engages a cocked leg 5a of the adjacent wire 5.

When the holder H is detached from the socket 1, the scanning lever 7 assumes a position which is identical with or close to the position shown in FIG. 1 or 2. This insures that the socket 1 cannot be indexed in response to actuation of the film transporting mechanism 8. Such unnecessary indexing of the socket 1 could result in extensive wear and would generate noise during the transport of photographic film preparatory to the making of exposures without artificial illumination of the subject.

Figure 4:
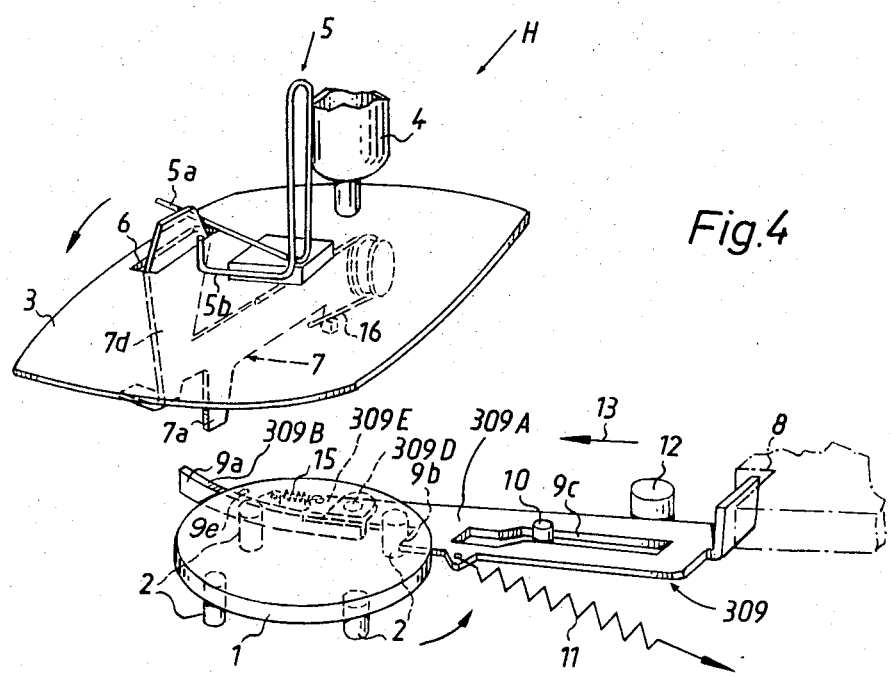
FIG. 4 is a perspective view similar to that of FIG. 3 but showing a portion of a second photographic apparatus.

FIG. 4 illustrates a portion of a flash lamp holder H which is identical with the holder of FIG. 1, 2 or 3 and a portion of a modified still camera. The difference is that the motion transmitting slide 309 comprises two discrete sections or portions 309A, 309B which are pivotally connected to each other by a pin 309D. A helical spring 15 is provided to bias the section 309B clockwise, as viewed in FIG. 4, whereby the section 309B normally abuts against a stop 309E of the section 309A. When the trapezoid upper end portion or head of the arm 7d of the scanning lever 7 extends well into the adjacent aperture 6 of the base plate 3, i.e., when the arm 7d does not engage a cocked leg 5a, the arm 7a is located above and away from the path of the slide 309 so that the shoulder 9b of the section 309A can engage the adjacent pin 2 and indexes the socket 1 and holder H through 90° in response to completed transport of the film by the length of a frame. If the lever 7 assumes a position corresponding to that shown in FIG. 1 or 2, the arm 7a extends into the path of movement of the convex cam face 9a on the section 309B and prevents the shoulder 9b from indexing the socket 1. When the slide 309 travels back to the starting position (under the action of the spring 11), the concave cam face 9e of the section 309B slides along the arm 7a and the section 309B pivots on the pin 309D counterclockwise against the opposition of the spring 15. The arrangement of FIG. 4 is clearly analogous to that of FIGS. 1–3 except that the front portion or section 309B of the motion transmitting slide 309 need not be elastic.

Figure 5:
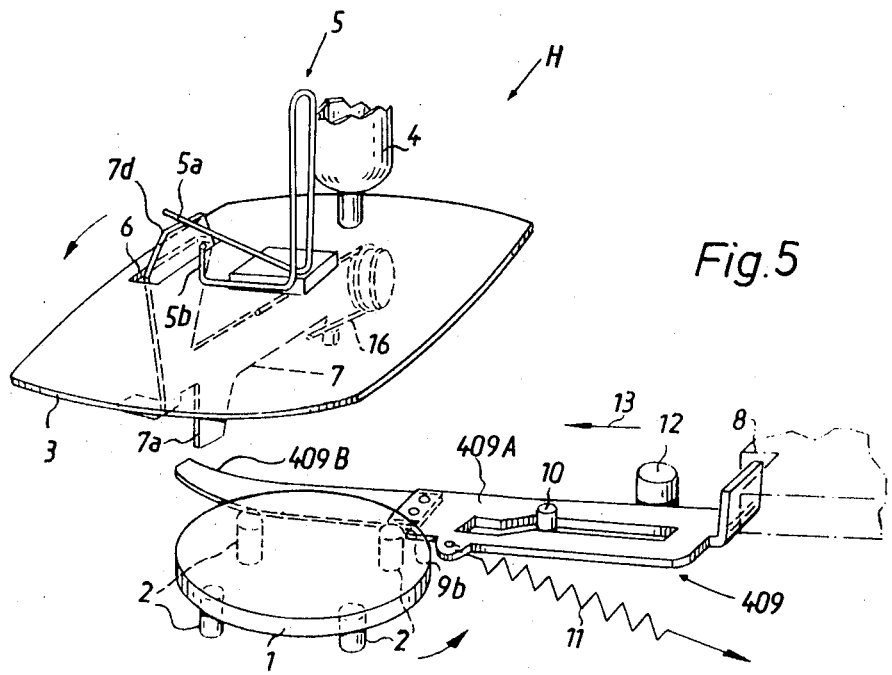
FIG. 5 is a view similar to that of FIG. 3 but showing a portion of a third photographic apparatus.

FIG. 5 illustrates a portion of a flash lamp holder H and a portion of a modified still camera. The recess 9d shown in FIGS. 1–3 has been omitted and the motion transmitting slide 409 comprises a front portion or section 409B which constitutes a leaf spring and is riveted or otherwise fixedly or separably fastened to the rear portion or secttion 409A. The leaf spring 409B does not undergo deformation when it moves in a plane which is normal to the axis of the guide pin 10 but can be elastically deformed by flexing in response to the application of a force acting in a direction which is parallel to the axis of the socket 1 and guide pin 10. The tip of the leaf spring 409B and/or the lower end portion of the arm 7a on the scanning lever 7 is preferably configurated in such a way that the leaf spring 409B is flexed downwardly when the slide 409 moves in the direction indicated by arrow 13 and the arm 7a is held in its lower end position corresponding to that shown in FIG. 1 or 2 whereby the leaf spring 409B causes the shoulder 9b to bypass the nearest pin 2 of the socket 1 when the film transporting mechanism 8 is actuated to advance the film by the length of a frame. When the arm 7a assumes the position shown in FIG. 5 (i.e., when the arm 7d of the scanning lever 7 has detected a fired flash lamp 4), the arm 7a does not interfere with the movement of the slide 409 so that the shoulder 9b can index the socket 1 and holder H through 90°.

Figure 6:
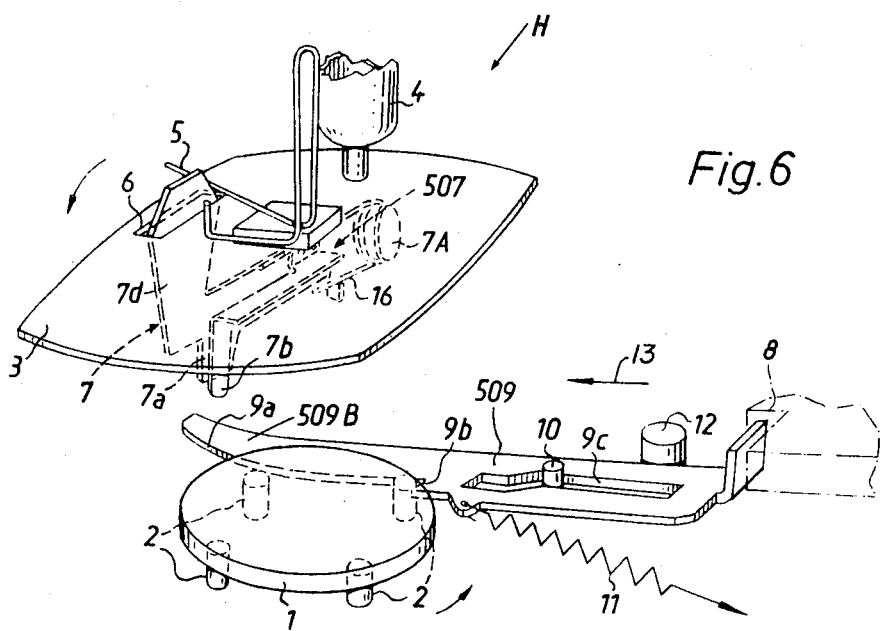
FIG. 6 is a view similar to that of FIG. 3 but showing a portion of a fourth photographic apparatus.

FIG. 6 illustrates a fourth embodiment of a still camera which can be used with flash lamp holders H of the type shown in FIGS. 1 to 5 and comprises a rigid motion transmitting slide 509 similar to that of FIG. 5 but consisting of a single piece of metallic, synthetic plastic or other suitable material. The scanning lever 7 is associated with an auxiliary lever 507 having an arm 7b and being pivotable on the pin 7A. The torsion spring 16 tends to pivot the auxiliary lever 507 in a counterclockwise direction, as viewed in FIG. 6. The arm 7b cooperates with the cam face 9a on the front section 509B of the slide 509 to prevent an indexing of the socket 1 when the arm 7d of the lever 7 extends well into the adjacent aperture 6 of the base plate 3. When in the position shown in FIG. 6, the arm 7b does not interfere with indexing of the socket 1.

It will be noted that, in each of the embodiments shown in FIGS. 1 3, 4, 5 and 6, the scanning lever 7 permits the motion transmitting slide 9, 309, 409 or 509 to move along a first path when the lever 7 assumes the position shown in FIG. 3, 4, 5 or 6 (i.e., when the arm 7d of the lever 7 engages a leg or indicator 5a which assumes a position indicating that the respective lamp 4 has been fired) whereby the actuation of the film transporting mechanism 8 results in indexing of the socket 1 because the shoulder 9b of the slide cannot bypass the adjacent pin 2. However, when the lever 7 assumes a position corresponding to that position of a leg 5a (see FIG. 1 or 2) which indicates that the corresponding flash lamp 4 is intact, the arm 7a of the lever 7 confines the slide 9, 309, 409 or 509 to movement along a second path whereby the shoulder 9b bypasses the adjacent pin 2 of the socket 1 so that the socket is not indexed because the flash lamp which is in an optimum position for illumination of a subject is ready to be fired. In the embodiments shown in FIGS. 1–6, the slide can be confined to movement along the second path in respone to pivoting about the guide pin 10 or in response to deformation of its front section.

The cameras of FIGS. 1 to 6 are susceptible of many additional modifications. For example, the motion transmitting slide 9, 309, 409 or 509 can be replaced with a lever and the illustrated operative connection between the slide and the film transporting mechanism 8 can be replaced with a positive connection so that the slide is retracted in response to each return movement of the film transporting mechanism to its starting position. Moreover, the slide can be mounted for movement in the axial direction of the guide pin 10 and the scanning lever 7 is then arranged to move the slide downwardly, as viewed in FIGS. 1–6, so as to maintain the slide at a level below the pins 2 of the socket 1 whenever the arm 7d of the scanning lever engages a cocked leg 5a. Such shifting of the slide in the axial direction of the guide pin 10 can be effected by the arm 7a or by another suitably configured portion of the scanning lever 7. It is equally within the purview of the invention to mount the slide in such a way that it is automatically disengaged from the film transporting mechanism 8 (i.e., that it cannot index the socket 1) when it engages the arm 7a while the arm 7d of the lever 7 engages a cocked leg 5a. This can be achieved, for example, by mounting the slide for axial, pivotal and translatory movement relative to the guide pin 10 whereby the slide moves axially of the pin 10 and becomes disengaged from the film transporting mechanism 8 when it encounters the arm 7a while the arm 7d assumes the position shown in FIG. 1 (in which an unfired flash lamp 4 faces the subject).

It is further possible to replace the slide 9, 309, 409 or 509 with a motion transmitting gear which forms part of a gear train connecting the socket 1 with the film transporting mechanism. Such a gear can be disconnected from the other gears of the gear train in response to movement of the scanning lever 7 to the position shown in FIG. 1 to thus interrupt the torque transmitting connection between the socket and the film transporting mechanism. For example, the gear replacing the slide 9, 309, 409 or 509 can be mounted on a lever which is controlled by the scanning lever 7 in such a way that the gear moves into mesh with other gears of the gear train when a fired lamp faces the subject (so that the socket 1 should be indexed through 90°) and that the gear replacing the slide moves radially and out of mesh with the other gears of the gear train when the multiple lamp holder is held in an angular position in which an intact flash lamp faces the subject. All such modifications will be readily comprehended upon perusal of the description of FIGS. 1–6.

Figure 7:
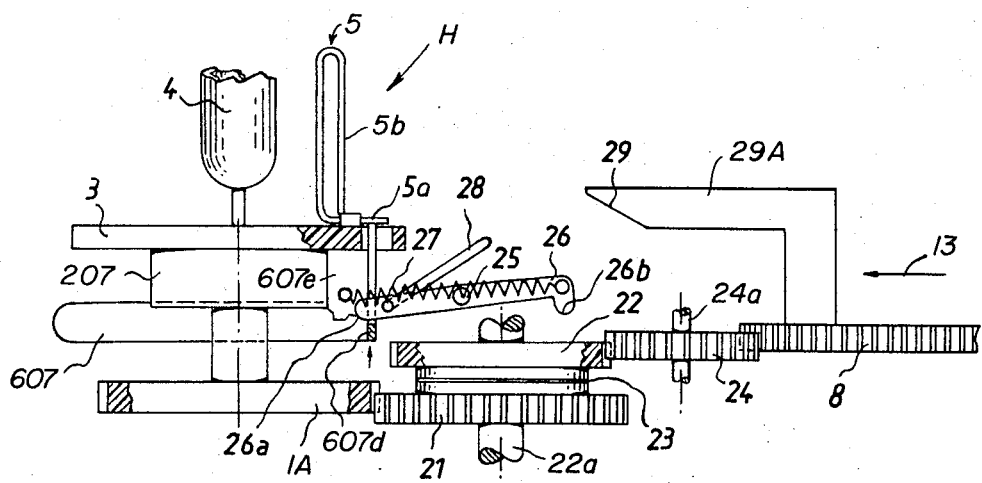
FIG. 7 is a fragmentary vertical sectional view of a fifth photographic appartus and of a flash lamp holder which is maintained in such angular position that an unfired flash lamp faces the subject.

FIG. 7 illustrates still another embodiment of a still camera which utilizes flash lamp holder H of the type shown in FIGS. 1–6 and a gear train which replaces the slide 9, 309, 409, or 509 and serves to index a socket 20 for the base plate 3 of the flash lamp holder in response to actuation of the film transporting mechanism. The latter comprises a toothed rack 8 which is movable in and counter to the direction indicated by arrow 13. The gear train comprises a first gear 24 which is rotatable about the axis of a fixedly mounted shaft 24a, a second gear 22 which is in permanent mesh with the gear 24 and is movable axially of its shaft 22a, a third gear 21 which is coaxial with the gear 22 and is held against axial movement, and a fourth gear 1A which meshes with the gear 21 and is rigid or integral with the socket 20. The means for transmitting torque from the film transporting mechanism to the socket 20 further comprises a friction clutch 23 which is interposed between the gears 21, 22 and is disengaged in automatic response to movement of the gear 22 upwardly and away from the gear 21.

The scanning lever 607 has an arm 607d which can detect the position of the leg 5a of a percussion wire 5 in the holder H and a further arm 607e which can pivot the left-hand arm of a two-armed lever 26 mounted on a horizontal pivot pin 25 of the camera body. The lever 26 is biased by a helical spring 27 which can hold it in either one of two end positions, namely, in a first end position in which the left-hand arm 26a of the lever 26 abuts against the arm 607e and a second end position in which the right-hand arm 26b of the lever 26 bears against the upper end face of the axially movable gear 22 and thereby maintains the friction clutch 23 in engaged condition.

The left-hand arm 26a of the lever 26 is provided with an inclined projection or follower 28 which can be engaged by an inclined cam face 29 provided on an L-shaped cam 29A secured to the toothed rack 8 of the film transporting mechanism.

FIG. 7 shows that the arm 607d of the scanning lever 607 bears against a cocked leg 5a. Thus, an intact flash lamp 4 faces the subject and the socket 20 should not be indexed in response to actuation of the film transporting mechanism including the rack 8. The spring 27 maintains the lever 26 in the illustrated end position in which the arm 26a bears against the arm 607e of the scanning lever 607; the arm 607e is located in the lower end position, as viewed in FIG. 7. A weak spring or the like (not shown) biases the gear 22 upwardly so that the friction clutch 23 is disengaged. Consequently, when the user of the camera causes the toothed rack 8 of the film transporting mechanism to move in the direction indicated by arrow 13, the rack 8 rotates the gears 24 and 22 but the gear 22 does not rotate the gear 21 so that the angular position of the socket 20 remains unchanged. The camera is ready to make an exposure with artificial illumination of the subject when the film transport is completed and the user decides to actuate the camera release, not shown, to open the shutter simultaneously with firing of that flash lamp 4 which faces the subject.

The firing of flash lamp 4 which faces the subject necessitates a disengagement of the leg 5a of the associated percussion wire 5 from the leg 5b whereby the arm 607d of the scanning lever 607 penetrates deeper into the adjacent aperture 6 of the base plate 3 and the arm 607e pivots the lever 26 clockwise, as viewed in FIG. 7. The spring 27 then takes over and pivots the lever 26 to the other end position in which the arm 26b bears against the top end face of the gear 22 and engages the friction clutch 23. Consequently, when the rack 8 moves in the direction indicated by arrow 13, the gear train 24, 22, 21 indexes the socket 20 and the lamp holder H so that an unfired flash lamp 4 faces the subject. The arm 26b also bears against the gear 22 and engages the clutch 23 if a flash lamp holder H is attached to the socket 20 in such angular position that a fired flash lamp 4 faces the subject. gear train 24, 22, 21 is completed, the cam face 29 reaches the follower 28 so that the lever 26 is forcibly returned to the illustrated angular position and the clutch 23 becomes disengaged. The follower 28 is free to pivot the lever 26 anticlockwise, as viewed in FIG. 7, because the arm 607e of the scanning lever 607 descends in automatic response to indexing of the holder H; the arm 607d is then expelled from the adjacent aperture 6 in the base plate 3 and cannot penetrate into the next aperture 6 if the latter is located below a cocked leg 5a. If the flash lamp 4 which follows a fired flash lamp is not intact (i.e., if such flash lamp has been fired before) the arm 607e of the scanning lever 607 prevents a pivoting of the lever 26 back to the position of FIG. 7 so that the user detects the failure of the film transporting mechanism to complete the transport of film by the length of a frame. Also, the clutch 23 remains engaged because the gear 22 is biased downwardly by the arm 26b. The user then removes the spent holder H and replaces it with a fresh flash lamp holder or removes the holder and attaches it to the socket 20 in an angular position in which an unfired flash lamp 4 faces the subject. Such situation can arise if a holder H with two unfired flash lammps 4 which are separated from each other by fired flash lamps has been attached to the socket 20 prior to the making of a first exposure with artificial illumination of the subject.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a photographic apparatus for use with holders containing groups of percussively ignitable flash lamps and having for each lamp an indicator which respectively assumes a first and a second position when the corresponding flash lamp is respectively intact and fired, a combination comprising a supporting device arranged to detachably support a holder and being indexible between a plurality of angular positions to thereby move successive lamps of the holder thereon to an optimum positon for illumination of a subject; a film transporting device actuatable to transport the film lengthwise; motion transmitting means interposed between said devices and engaging said devices during indexing of said supporting device; and scanning means for tracking the indicator associated with that lamp of a holder on said supporting device which assumes said optimum position, said scanning means being movable between a first position which corresponds to the first position of the indicator for the lamp in said optimum position and in which said scanning means disengages said motion transmitting means from contact with at least one of said devices so that the actuation of said film transporting device does not result in indexing of said supporting device and said motion transmitting means does not move said supporting device, and a second position which corresponds to the second position of the indicator for the lamp in said optimum position and in which said motion transmitting means is free to index said supporting device in response to actuation of said film transporting device.

2. A combination as defined in claim 1 for use with substantially cuboid holders having a reflector located behind each flash lamp, wherein said supporting device comprises a socket for a portion of a holder and said indicators include portions of resilient percussion wires, said portions of said wires being cocked in said first positions and dissipating energy during movement from said first to said second positions thereof.

3. A combination as defined in claim 1, wherein said motion transmitting means is movable along first and second paths in response to actuation of said film transporting device and said supporting device includes a portion extending into said first path, said scanning means comprising a portion arranged to confine said motion transmitting means to movement along said second path in said first position of said scanning means so that said motion transmitting means then bypasses said portion of said supporting device.

4. A combination as defined in claim 3, wherein said scanning means comprises a lever which is pivotable between said first and second positions and said portion of said scanning means comprises a projection provided on said lever and extending into said first path in said first position of said scanning means.

5. A combination as defined in claim 3, further comprising resilient means operatively connected with said motion transmitting means and arranged to store energy during movement of said motion transmitting means in response to actuation of said film transporting device.

6. A combination as defined in claim 1, further comprising means for maintaining said scannig means in or for moving said scanning means to said first position in response to detachment of a holder from said supporting device.

7. A combination as defined in claim 1, wherein said supporting device is indexible about a first axis and said scanning means comprises a member which is pivotable about a second axis inclined with respect to said first axis.

8. In a photographic apparatus for use with holders containing groups of percussively ignitable flash lamps and having for each lamp an indicator which respectively assumes a first and a second position when the corresponding flash lamp is respectively intact and fired, a combination comprising a supporting device arranged to detachably support a holder and being indexible between a plurality of angular positions to thereby move successive lamps of the holder thereon to an optimum position for illumination of a subject; a film transporting device actuatable to transport the film lengthwise; motion transmitting means interposed between said devices and being movable along first and second paths in response to actuation of said film transporting device, said supporting device including a portion extending into said first path; scanning means for tracking the indicator associated with that lamp of a holder on said supporting device which assumes said optimum position, said scanning means being movable between a first position which corresponds to the first position of the indicator for the lamp in said optimum position and in which said scanning means disengages said motion transmitting means from said supporting device so that the actuation of said film transporting device does not result in indexing of said supporting device, and a second position which corresponds to the second position of the indicator for the lamp in said optimum position and in which said motion transmitting means is free to index said supporting device in response to actuation of said film transporting device, said scanning means comprising a portion arranged to confine said motion transmitting means to movement along said second path in said first position of said scanning means so that said motion transmitting means then bypasses said portion of said supporting device; and fixed guide means extending into a slot provided in said motion transmitting means.

9. In a photographic apparatus for use with holders containing groups of percussively ignitable flash lamps and having for each lamp an indicator which respectively assumes a first and a second position when the corresponding flash lamp is respectively intact and fired, a combination comprising a supporting device arranged to detachably support a holder and being indexible between a plurality of angular positions to thereby move successive lamps of the holder thereon to an optimum position for illumination of a subject; a film transporting device actuatable to transport the film lengthwise; motion transmitting means interposed between said devices and comprising a first section which is movable along a predetermined path in response to actuation of said film transporting device and a second section movable relative to said first section between first and second positions in which said second section respectively indexes and bypasses said supporting device in response to movement of said first section along said path; and scanning means for tracking the indicator associated with that lamp of a holder on said supporting device which assumes said optimum position, said scanning means being movable between a first position which corresponds to the first position of the indicator for the lamp in said optimum position and in which said scanning means disengages said motion transmitting means from said supporting device so that the actuation of said film transporting device does not result in indexing of said supporting device, and a second position which corresponds to the second position of the indicator for the lamp in said optimum position and in which said motion transmitting means is free to index said supporting device in response to actuation of said film transporting device, said scanning means comprising a portion arranging to move said second section of said motion transmitting means to said second position in said first position of said scanning means.

10. A combination as defined in claim 9, wherein said second section of said motion transmitting means is elastically deformable between said first and second positions thereof.

11. A combination as defined in claim 9, wherein said motion transmitting means further comprises resilient means for biasing said second section to said first position.

12. In a photographic apparatus for use with holders containing groups of percussively ignitable flash lamps and having for each lamp an indicator which respectively assumes a first and a second position when the corresponding flash lamp is respectively intact and fired, a combination comprising a supporting device arranged to detachably support a holder and being indexible between a plurality of angular positions to thereby move successive lamps of the holder thereon to an optimum position for illumination of a subject; a film transporting device actuatable to transport the film lengthwise; motion transmitting means interposed between said devices; scanning means for tracking the indicator associated with that lamp of a holder on said supporting device which assumes said optimum position, said scanning means being movable between a first position which corresponds to the first position of the indicator for the lamp in said optimum position and in which said scanning mens disengages said motion transmitting means from said supporting device so that the actuation of said film transporting device does not result in indexing of said supporting device, and a second position which corresponds to the second position of the indicator for the lamp in said optimum position and in which said motion transmitting means is free to index said supporting device in response to actuation of said film transporting device; and guide means for said motion transmitting means, said motion transmitting means comprising an element which is movable by said film transporting means about a predetermined axis and is further movable by said scanning means along said axis to be thereby disengaged from said supporting device.

13. A combination as defined in claim 12, wherein said motion transmitting means includes a gear train and said element constitutes one gear of said gear train.

14. A combination as defined in claim 13, wherein said gear train further comprises a second gear coaxial with said first mentioned gear and clutch means interposed between said gears, said clutch means being engaged in said second position and being disengaged in said first position of said scanning means.

15. A combination as defined in claim 14, further comprising a clutch engaging device arranged to engage said clutch means in response to movement of said scanning means from said first to said second position thereof.

16. A combination as defined in claim 15, wherein said clutch engaging device comprises a lever movable between a first end position in which said lever maintains said clutch means in engaged condition and a second end position in which said clutch means remains disengaged, said scanning means comprising a portion for moving said lever to said second position in response to movement of said scanning means to said first position and said film transporting means having a portion for moving said lever to said first position in response to actuation of said film transporting device in the second position of said scanning means.

17. A combination as defined in claim 16, further comprising resilient means arranged to oppose the movement of said lever from either end position thereof.

18. In a photographic apparatus for use with holders containing groups of percussively ignitable flash lamps and having for each lamp an indicator which respectively assumes a first and a second position when the corresponding flash lamp is respectively intact and fired, a combination comprising a supporting device arranged to detachably support a holder and being indexible between a plurality of angular positions to thereby move successive lamps of the holder thereon to an optimum position for illumination of a subject; a film transporting device actuatable to transport the film lengthwise; motion transmitting means interposed between said devices and being movable along first and second paths in response to actuation of said film transporting device, said supporting device including a portion extending into said first path; scanning means for tracking the indicator associated with that lamp of a holder on said supporting device which assumes said optimum position, said scanning means being movable between a first position which corresponds to the first position of the indicator for the lamp in said optimum position and in which said scanning means disengages said motion transmitting means from said supporting device so that the actuation of said film transporting device does not result in indexing of said supporting device, and a second position which corresponds to the second position of the indicator for the lamp in said optimum position and in which said motion transmitting means is free to index said supporting device in response to actuation of said film transporting device, said scanning means comprising a portion arranged to confine said motion transmitting means to movement along said second path in said first position of said scanning means so that said motion transmitting means then bypasses said portion of said supporting device; and guide means for said motion transmitting means, said motion transmitting means being pivotable on said guide means by said scanning means and being movable transversely of said guide means in response to actuation of said film transporting device.

19. A combination as defined in claim 18, wherein said portion of said scanning means extends into said first path in said first position of said scanning means and said motion transmitting means comprises a cam face which engages said portion of said scanning means and causes said motion transmitting means to travel along said second path in response to actuation of said film transporting device in said first position of said scanning means.

* * * * *